(12) United States Patent
Ramakrishnan et al.

(10) Patent No.: US 11,333,131 B2
(45) Date of Patent: May 17, 2022

(54) METHOD OF IDENTIFYING A FAULT IN A SYSTEM OF GEARS IN A WIND TURBINE

(71) Applicant: VESTAS WIND SYSTEMS A/S, Aarhus N (DK)

(72) Inventors: Pattabiraman Trichy Ramakrishnan, Chennai (IN); Mallikarjun Narayanpur, Karnataka (IN)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 661 days.

(21) Appl. No.: 16/098,682

(22) PCT Filed: May 4, 2017

(86) PCT No.: PCT/DK2017/050136
§ 371 (c)(1),
(2) Date: Nov. 2, 2018

(87) PCT Pub. No.: WO2017/190746
PCT Pub. Date: Nov. 9, 2017

(65) Prior Publication Data
US 2021/0239098 A1     Aug. 5, 2021

(30) Foreign Application Priority Data

May 20, 2015   (DK) .............................. PA201670295

(51) Int. Cl.
*F03D 17/00*     (2016.01)
*F03D 15/10*     (2016.01)
(Continued)

(52) U.S. Cl.
CPC ............ *F03D 17/00* (2016.05); *F03D 15/10* (2016.05); *G01H 1/003* (2013.01); *G01H 1/16* (2013.01);
(Continued)

(58) Field of Classification Search
CPC .......... F03D 15/10; G01H 1/003; G01H 1/16; G01M 13/021
(Continued)

(56) References Cited

U.S. PATENT DOCUMENTS 5,875,420 A    2/1999  Piety et al.
8,171,797 B2   5/2012  Hatch et al.
(Continued)

FOREIGN PATENT DOCUMENTS

CN    103140672 A    6/2013
CN    104236908 A    12/2014
(Continued)

OTHER PUBLICATIONS

PCT International Search Report for Application No. PCT/DK2017/050136 dated Oct. 7, 2017.
(Continued)

*Primary Examiner* — Aditya S Bhat
(74) *Attorney, Agent, or Firm* — Patterson + Sheridan, LLP

(57) ABSTRACT

A method of identifying a fault in a system of gears in a wind turbine is provided. The method determines two or more centre harmonic frequency amplitudes according to vibrations of the system of gears and determines a plurality of sideband amplitudes of each of the centre harmonic frequency amplitudes. Further, the method sums the centre harmonic frequency amplitudes to calculate a total centre harmonic frequency amplitude and sums each of the sideband amplitudes of the centre harmonic frequency amplitudes to calculate a total sideband amplitude. The method then determines a value indicative of damage incurred by the system of gears based upon the first centre harmonic frequency amplitude and the average sideband amplitude.

19 Claims, 6 Drawing Sheets

(51) Int. Cl.
*G01H 1/00* (2006.01)
*G01H 1/16* (2006.01)
*G01M 13/021* (2019.01)
*F16H 57/02* (2012.01)

(52) U.S. Cl.
CPC ....... *G01M 13/021* (2013.01); *F05B 2260/80* (2013.01); *F05B 2270/334* (2013.01); *F16H 2057/02078* (2013.01)

(58) Field of Classification Search
USPC .......................................................... 702/76
See application file for complete search history.

(56) References Cited

U.S. PATENT DOCUMENTS

| | | | |
|---|---|---|---|
| 9,459,179 | B2 | 10/2016 | Brenner et al. |
| 2003/0074159 | A1 | 4/2003 | Bechhoefer et al. |
| 2010/0256932 | A1 | 10/2010 | Kar |
| 2012/0025526 | A1* | 2/2012 | Luo .......................... F03D 80/70 290/44 |
| 2012/0029838 | A1 | 2/2012 | Hallman et al. |
| 2012/0073364 | A1* | 3/2012 | Hatch .................... G01H 1/003 73/162 |
| 2013/0314694 | A1* | 11/2013 | Tchoryk, Jr .......... G01N 21/538 356/28.5 |
| 2017/0205316 | A1* | 7/2017 | Araki ...................... F04C 18/16 |

FOREIGN PATENT DOCUMENTS

| | | |
|---|---|---|
| EP | 2072975 A1 | 6/2009 |
| WO | 2004018981 A1 | 3/2004 |
| WO | 2010114735 A2 | 10/2010 |
| WO | 2015176055 A1 | 11/2015 |
| WO | 2017190746 A1 | 11/2017 |

OTHER PUBLICATIONS

Z. Hameed et al: "Condition monitoring and fault detection of wind turbines and related algorithms: A review", Renewable and Sustainable Energy Reviews, vol. 13, No. I, Jan. 1, 2009 (Jan. 1, 2009), pp. 1-39, XP055029113, ISSN: 1364-0321, DOI: 10.1016/j.rser. 2007.05.008 p. 18, paragraph 2.3.2 3—p. 20, paragraph 2.3.2.6.
Danish Patent and Trademark Office First Technical Examination Report for Application No. PA 2016 70295 dated Dec. 31, 2016.
PCT Written Opinion of the International Searching Authority for Application No. PCT/DK2017/050136.
State Intellecutal Property Office (SIPO) of the People's Republic of China Notification of the First Office ACtion for Application No. 201780041525.1 dated Feb. 21, 2020.

* cited by examiner

METHOD OF IDENTIFYING A FAULT IN A SYSTEM OF GEARS IN A WIND TURBINE

CROSS-REFERENCE TO RELATED APPLICATIONS

This application claims the benefit of PCT application PCT/DK2017/050136, filed May 4, 2017; and Danish application PA201670295, filed May 4, 2016. The aforementioned related patent applications are herein incorporated by reference in their entirety.

BACKGROUND OF THE INVENTION

This invention relates to the field of identifying faults in systems of gears, and particularly to the field of identifying faults in a system of gears in a wind turbine.

Wind turbines are a source of renewable energy, and many countries have increased their use of these turbines in the effort to reduce their reliance on harmful fossil fuels. Indeed, large arrays of wind turbines, known as wind power plants, are being created across the world as part of a strategy to reduce pollution.

Thus, ensuring the continuous and smooth running of wind turbines is becoming more and more important, as is the need to minimise the down-time of any faulty turbines. However, with the rapidly increasing number of wind turbines in operation this is becoming increasingly difficult.

One common type of fault in a wind turbine are faults within the wind turbine gear box. These faults are notoriously difficult to diagnose due to the complexity of the gearboxes and the low signal to noise ratio. A large noise is produced by the running of the gears compared to the relatively weak signal produced by a small gear defect. Therefore, this type of fault typically results in long down times and is a major issue in wind turbines becoming a viable alternative energy source to fossil fuels.

Various attempts have been made to overcome this problem. For example, in patent document U.S. Pat. No. 8,171, 797B2, a method for assessing the deterioration in a gearbox is disclosed. This method uses data obtained from an operating gearbox and uses this data to provide an indication of deterioration.

However, such methods have not taken into account a true representation of the energy distribution that results from a gear fault. As a result, these methods do not provide an accurate representation of gear progression and may incorrectly diagnose a healthy gearbox as having a fault, or may provide misleading or incorrect information.

SUMMARY OF THE INVENTION

We have appreciated the need to improve upon the existing systems and methods currently available and accordingly have provided an invention embodiments of which may have benefits including reduced warranty costs, increased machine life and reliability, reduced spare part cost and increase lead time for maintenance and spare planning.

The invention is defined in the independent claims, to which reference is now directed. Preferred features are set out in the dependent claims.

The invention provides a method of identifying a fault in a system of gears in a wind turbine. The method comprises determining two or more centre harmonic frequency amplitudes according to vibrations of the system of gears. The method further comprises determining a plurality of sideband amplitudes of the centre harmonic frequency amplitudes. The method further includes summing the centre harmonic frequency amplitudes to calculate a total centre harmonic frequency amplitude and summing each of the sideband amplitudes of the centre harmonic frequency amplitudes to calculate a total sideband amplitude. In addition, a value indicative of the damage incurred by the system of gears based upon the total sideband amplitude and the total centre harmonic frequency amplitude is determined.

Such a method is advantageous as there is currently no clear guide-line in the industry as to which harmonic needs to be analysed to identify and track any given fault within a system of gears. This is because the most appropriate harmonic to analyse for a given situation may vary from fault to fault, which means that no single harmonic can be used across all faults. This adds to the complication of identifying and tracking faults. The present invention solves this problem by taking into account more than one harmonic in the analysis, as well as the sidebands associated with each harmonic being considered. The resulting relationship can then be used generally across all faults; there is no need to individually analyse different harmonics and their respective sidebands as they have been taken into account in the summations described herein.

Optionally, the centre harmonic frequency amplitudes are the centre harmonic tooth mesh frequency amplitudes.

Optionally, the system of gears is a multi-stage system of gears, wherein each centre harmonic frequency amplitude is correlated to a mesh between gears. Further, the method optionally comprises determining a fault within a particular mesh of gears within the system of gears based upon the value indicative of damage for a particular centre harmonic frequency. This is advantageous as it allows the controller, or alternatively or in addition, an operator, of the wind turbine or wind park to determine where in the system of gears the fault lies and therefore allows the fault to be addressed efficiently.

Optionally, the first centre harmonic frequency amplitude of the two or more centre harmonic frequency amplitude is at a fundamental harmonic frequency for the system of gears.

Optionally, one or more of the two or more centre harmonic frequency amplitudes is at a harmonic of a fundamental frequency amplitude.

Optionally, a third centre harmonic frequency amplitude is at a second harmonic of the first harmonic frequency amplitude, and a second harmonic frequency amplitude is at a first harmonic of the first harmonic frequency amplitude different to the second harmonic frequency amplitude.

Optionally, determining the value comprises calculating a ratio of the total centre harmonic frequency amplitude and the associated total sideband amplitude or, alternatively calculating a ratio of the associated total sideband amplitude and the total centre harmonic frequency amplitude. The ratio is compared to a threshold to identify whether a fault is present in the system of gears. Further, the ratio is optionally repeatedly calculated while the ratio is within the threshold to obtain a plurality of ratio value and, if a ratio value is calculated that is outside the threshold, optionally outputting data indicating that a fault has been identified in the system of gears. This allows the health of the system of gears to be monitored by a system embodying the invention such that when action is need in relation to a fault, a recommendation is issued.

Optionally, the method further comprises repeatedly calculating the ratio for a predetermined period of time to obtain a plurality of ratio values.

Optionally, the ratio values are used to track the progression of a fault. The fault is optionally tracked by comparing each successively calculated ratio value with a threshold value. Alternatively, or in addition, the fault is tracked by comparing each ratio value of the plurality of ratio values with one or more other ratio values of the plurality of ratio values. This is advantageous at it allows the tracking of a reduction in height between the total centre amplitude and the total sideband amplitude and such tracking is indicative of gear fault progression.

Optionally, at least six sideband amplitudes on either side of each central harmonic frequency amplitude are used to calculate the respective average sideband amplitude.

Optionally, the method further comprising controlling the wind turbine based on the value indicative of damage.

Embodiments of the invention also provide a controller for controlling a wind turbine or a wind power plant, the controller being configured to carry out any of the methods described herein. The invention also provides a wind turbine or wind power plant comprising such a controller.

Embodiments of the invention also provide a computer program which when executed on a controller or other computing device causes it to carry out any of the methods described herein.

BRIEF DESCRIPTION OF THE DRAWINGS

The invention will be described in more detail by way of example with reference to the accompanying drawings, in which.

DESCRIPTION OF A PREFERRED EMBODIMENT OF THE INVENTION

The invention may be embodied in a variety of methods and systems for identifying a fault in a system of gears in a wind turbine. The main embodiment described is a controller for implementing a method of identifying a fault in a system of gears in a wind turbine according to the present invention. A system embodying the invention will first be described with reference to FIG. 1. An embodying method implemented by the embodying system will then be described with reference to FIG. 2, before turning to two specific examples providing further details of how the invention may be implemented.

Figure 1:
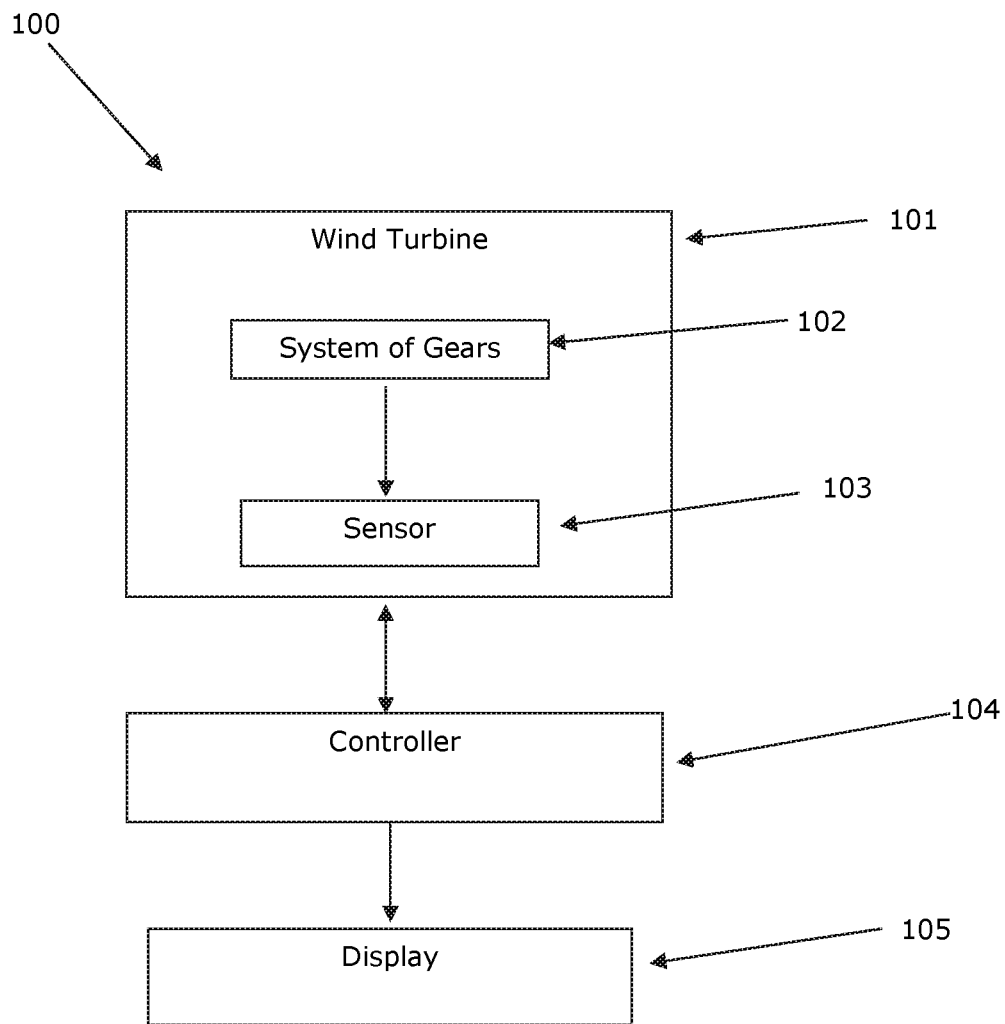
FIG. 1 is a diagram of the main functional components of a system embodying the invention.

FIG. 1 shows a system 100 according to an embodiment of the invention. The system 100 comprises a wind turbine 101, which itself comprises a system of gears 102 and a sensor 103. The general set up and arrangement of the gears within a wind turbine is well known in the art and as such will not be described in detail. However, to aid understanding, it should be noted that systems of gears used in wind turbines are typically multi-stage, for example, a low speed stage, an intermediate speed stage, and a high speed stage, allowing the speed of rotation of the gears to be stepped up and down as appropriate. In the present embodiment a three stage gearbox is used. However, it will be appreciated that the invention is applicable to any arrangement of gears that can conceivably be used within a wind turbine. For example, any two stage, three stage gearbox or other multi-stage gearbox suitable for use in a wind turbine can be used.

The system further comprises a controller 104 and a display 105. The controller 104 and the display 105 are integrated to form a single unit and disposed separately to the wind turbine. The single unit may be a computer which is in communication with the wind turbine 101. Alternatively the single unit may be a tablet or other appropriate device. Further, although the controller and the display are described as being a single unit, other arrangements are possible. For example, system 100 may be entirely integrated into the wind turbine 101, such that the controller 104 and the display 105 are directly attached to the wind turbine 101. Alternatively, the controller may be integrated into the wind turbine but the display is disposed elsewhere, or vice versa, or any further conceivable arrangements.

In response to the rotation of the wind turbine 101, the gears in the system of gears 102 will rotate. The rotation of the gears causes the system of gears 102 to vibrate, producing a vibrational pattern for that system of gears 102. This vibration pattern is dependent on the health of the system of gears 102. If there are no faults present in the system of gears (i.e. it is a healthy system), the teeth of adjacent gears will interlock, or mesh, smoothly and will produce a certain vibrational pattern. If a fault is present, the gear containing the fault will not mesh smoothly with its adjacent gears and this will change the vibrational pattern.

Faults in the system of gears typically relate to damaged gear teeth. For example, a cracked or broken gear tooth will affect how that gear meshes with the gears it interlocks with, which affects the vibrational pattern of the system. However, other types of gear faults are possible as will be apparent to those skilled in the art. It will be appreciated that the present method is applicable to any conceivable gear fault that affects gear meshing.

The sensor 103 is used to measure the vibrations produced by the system of gears, and can be used to collect data on the condition of the system of gears. The sensor data may be provided as part of condition monitoring systems (CMS) data. The sensor 103 may be an accelerometer, detecting acceleration caused by the vibrations and is mounted on the gear box. It will be appreciated that the sensor may be mounted with respect to the system of gears in any way that allows the sensor to measure the vibrations of the system of gears. For example, in the present embodiment, the sensor may be mounted on an exterior surface of the gear box or the sensor may be mounted on an interior surface of the gear box. Alternatively, the sensor may be mounted on any surface of the wind turbine which enables the vibrational data to be measured. The sensor 103 may be an accelerometer or any other sensor that is appropriate for measuring the vibrations of the system of gears 102.

The vibrational data obtained by the sensor 103 is then collected or received by the controller 104. The data may be collected by the controller 104 using any appropriate data acquisition device (DAU).

The controller 104 then stores the collected vibrational data in memory. The controller may comprise a storage device such as hard disc drive or a solid state drive, in which it may store and retrieve vibrational data. Alternatively, or in addition, the controller may be connected to a server, which the controller can access to both store newly collected vibrational data and also retrieve vibrational data that has already been stored.

Although the controller has been described in the present embodiment as comprising the DAU, it will be appreciated that the DAU may be a separate component which collects the data from the sensor and relays the data to the controller. Alternatively, or in addition, if the controller is connected to a server, the DUA may send the vibrational data directly to the server.

The controller 104 retrieves vibrational data from memory and analyses the data according to the methods as described herein. From the results of the analysis, the controller 104 is able to identify whether a fault is present in the system of gears 102 in the wind turbine 101. The controller 104 may perform the analysis using an algorithm on a MATLAB™ platform. Alternatively, any appropriate software platform for implementing the invention may be used. The results may be written by the controller 104 in any appropriate format, including xl format, and can accordingly be displayed visually, such as by being plotted as one or more graphs. This facilitates the conveyance of the information regarding the fault to an operator of the system 100.

As explained below, the controller 104 can track the progression of a fault in the system of gears by monitoring the vibrational data that it receives from the sensor 103. Further, the controller 104 may send information relating to the fault and its progression, optionally along with recommendations as to any action that should be taken in relation to the fault, to a display 105, which can be viewed by an end user. This allows the end user to easily determine the health of the system of gears at any point in time and whether the fault is such that further action is required.

Figure 2:
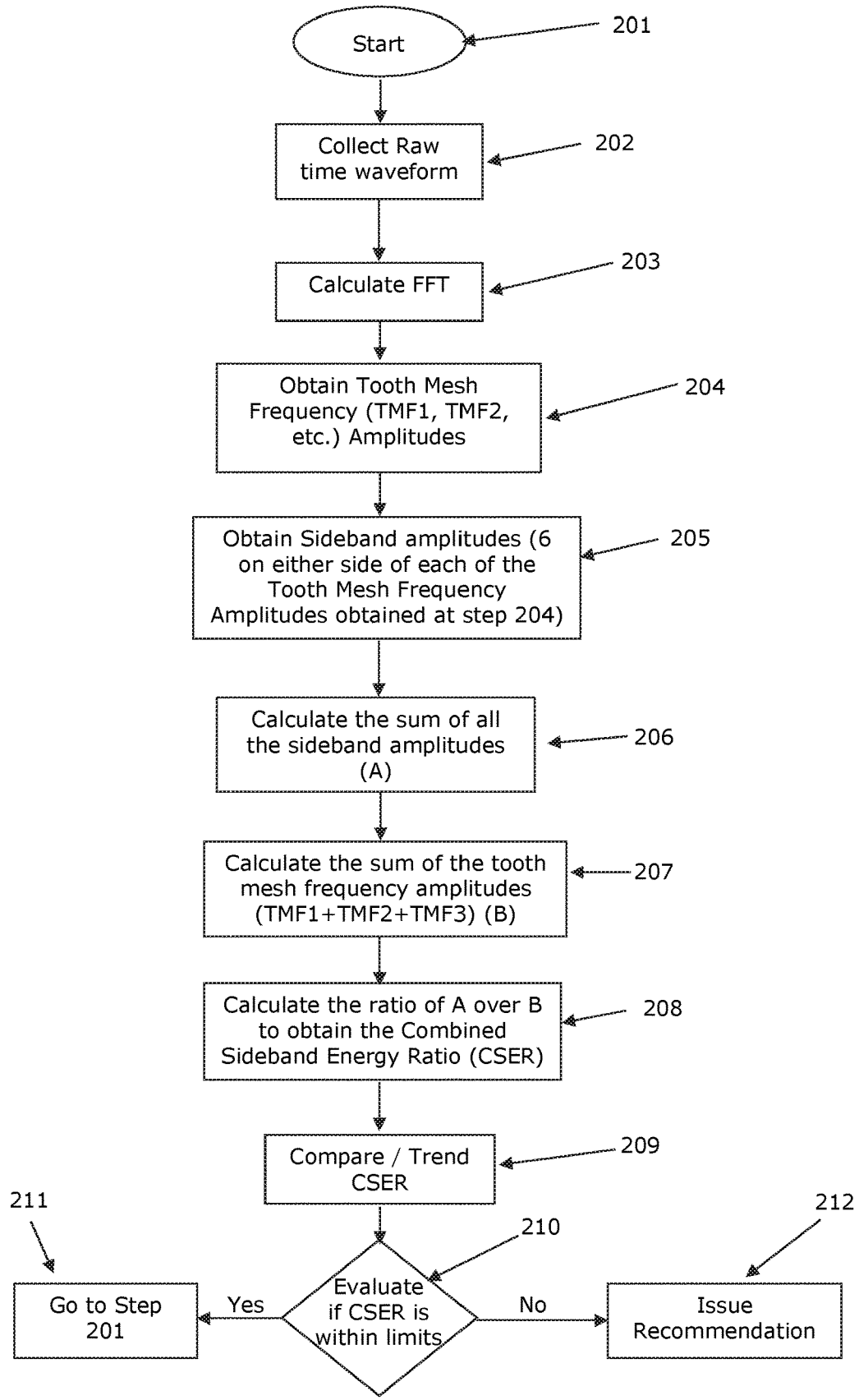
FIG. 2 is a flow diagram of the main functional steps of a method embodying the invention.

FIG. 2 shows an example of a method embodying the present invention of identifying a fault in a system of gears in a wind turbine. In the present embodiment the method is implemented by controller 104 of system 100 shown in FIG. 1. However, systems other than that shown in FIG. 1 may be used to implement the invention.

The process of identifying a fault starts at step 201. At step 202 the controller 104 receives vibrational data from sensor 103 in the form of a raw time waveform. The controller 104 then calculates a fast Fourier transform (FFT) at step 203 converting the raw time waveform into the frequency domain. The general principles behind steps 202 and 203 are both well known in the art and as such will not be described further.

The controller 104 then analyses the FFT data and obtains a first and a second centre harmonic frequency amplitudes according to the measured vibrations of the system of gears at step 204. The first centre harmonic frequency amplitude is a fundamental tooth mesh frequency amplitude, and the second centre harmonic frequency amplitude is a harmonic of the first centre tooth mesh frequency amplitude. Each gear mesh in the system of gears 102 has a fundamental tooth mesh frequency (TMF1), which represents the frequency at which the teeth of interlocking gears come together, i.e. the number of teeth multiplied by shaft speed. As such, the controller may obtain a specific amplitude in relation to a particular gear mesh, allowing for the system to monitor faults in relation to a particular stage of the system of gears 102, i.e. the frequency at which an amplitude is measured is indicative of a particular mesh that is responsible for producing that amplitude.

Any amplitude obtained by controller 104 represents an acceleration of the vibrations measured by the sensor. At the tooth mesh frequency of a particular mesh in the system of gears, there will generally be a spike in the measured vibration acceleration. As the tooth mesh frequency is a known quantity, the controller can directly look to this frequency and obtain the spike in the acceleration. The value of the acceleration obtained by the controller 104 is the tooth mesh frequency amplitude for the mesh. Because the tooth mesh frequency is a known quantity, the frequency peaks (including harmonics) can be associated with the particular gear mesh responsible for generating said peaks.

Further, each fundamental tooth mesh frequency has higher harmonics associated with it (TMF2, TMF3, etc.). These higher harmonics provide additional, supplementary information regarding a fault and its progression. In addition, for particular types of faults, any one of these higher harmonics may be more suitable to identify and track the progression of a fault than the TMF1 amplitude (i.e., for certain types of faults, a particular harmonic may be more appropriate to monitor than another harmonic). It should be understood that these higher harmonics of the fundamental tooth mesh frequency all relate to the particular gear mesh that the fundamental frequency is associated with; these centre harmonic frequencies are a set of harmonic frequencies that relate to a particular gear mesh.

Further, it should be appreciated that the controller 104 may obtain vibrational data from more than one gear mesh of the system of gears. Thus, the controller can obtain more than one set harmonic frequencies, with each set being associated with a particular gear mesh. Therefore, the controller 104 is not limited to monitoring a single gear mesh. Indeed, the controller 104 may monitor the health of multiple gear meshes by performing the analysis as described below on multiple sets of harmonic frequencies. As a result, if more than one fault is present across more than one gear mesh, the controller 104 can identify and track the progression of one of these faults, or two or more of these faults simultaneously.

Although the present embodiment has been described in relation to tooth mesh frequency amplitudes, it will be appreciated that other appropriate harmonic frequency amplitudes may be used. For example, the rotational frequency or other appropriate quantity obtained by the CMS data may be used. Further, additional harmonics may be obtained by the controller at step 204. For example, TMF1, TMF2 and TMF3 may be obtained, or TMF2 and TMF3 may be obtained and TMF1 not, or any other variation suitable for identifying a fault.

Once the centre harmonic frequency amplitudes have been obtained at step 204, the controller 104 determines a plurality of sideband amplitudes of the TMF1 amplitude and a plurality of sideband amplitudes of the second centre harmonic frequency amplitude at step 205. These sidebands are a result of a modulation of the centre harmonic frequencies due to imperfections in the gears. In other words, sidebands develop around a centre frequency as a result of the modulation of that centre frequency. This modulation is itself a result of mesh imperfections and the number of sidebands and their amplitudes depend on the particular imperfection. If the system of gears 102 is healthy and the gears are meshing efficiently, the sideband amplitudes will be small compared to their centre amplitudes, as there will be little modulation of the centre amplitudes. If a fault is present and the gears are not meshing correctly, there will be greater modulation of the centre frequencies, and the amplitudes of the sidebands relative to the centre frequency amplitudes will increase.

There is typically a plurality of sideband amplitudes arranged at evenly spaced frequencies on either side of the centre frequency, with each sideband amplitude containing some information regarding the modulation of the centre frequency. In the present embodiment, the first six sideband amplitudes on either side of each of the centre frequencies are calculated at step 205. This number has been found, experimentally, to provide the optimum results for identifying and tracking the progression of a fault. However, it will be appreciated that more or fewer sidebands could be used. It will also be appreciated that it is not necessary to use an equal number of sidebands on either side of the centre frequency. For example, 12 sidebands could be obtained on one side of the centre frequency and none on the other side.

All the sideband amplitudes obtained at step 205 are then summed together at step 206 to obtain a total sideband amplitude, i.e. the sideband amplitudes of both the TMF1 amplitude and the TMF2 amplitude are included in the sum to obtain a single total sideband amplitude.

At step 207 the centre amplitudes TMF1 and TMF2 are summed together to obtain a total centre harmonic frequency amplitude.

As discussed above, if additional harmonics are obtained by controller at step 204, then these amplitudes and their sideband amplitudes are included in the calculation at step 207 and 206 respectively.

Once both the total tooth mesh frequency amplitude and the total sideband amplitude of the fundamental tooth mesh frequency amplitude have been calculated by the controller 104, the controller determines a value indicative of damage incurred by the system of gears based upon the total centre harmonic frequency amplitude and the total sideband amplitude at step 208. In the present embodiment, this value is a ratio of the total sideband amplitude to the total centre harmonic frequency amplitude, which is referred to from here on out as the Combined Sideband Energy Ration (CSER).

At steps 209-212, the controller 104 analyses the CSER, identifies whether a fault is present in the system of gears 102, and determines whether to issue a recommendation based on the analysed data.

As discussed above, if a fault is present, the amplitude of the sidebands is greater relative to the central amplitude than if a fault is not present. Thus, the smaller the value of the CSER the healthier the system of gears 102 are, and conversely, the larger the CSER the more severe the fault. Therefore, at step 209, the controller 104 may compare the CSER with a threshold value. At step 210, the controller, may evaluate whether the CSER is above or below the threshold value. If the CSER is above the threshold, the fault is severe and action is required (for example, the installation of a new gear), and the controller may issue a recommendation at step 212. This recommendation is sent to display 105 to be viewed by an end user. Correspondingly, if the CSER is below the threshold, the fault is not severe and the controller restarts the process at step 211.

The controller may then repeat the process until the threshold is reached, calculating a plurality of CSER values. The process may be repeated at intervals, and may in particular be repeated periodically. These values may be compared at step 209, and any change in the values can be monitored. In this way, the progression of a fault may be continually monitored by the controller. This is done until the fault reaches a point where action is required. At which point, a recommendation may be issued. The recommendation may indicate where in the system of gears the fault lies, what action is required, or provide any information that may be useful in addressing the fault. As described above, the values may be written in an xl format and plotted accordingly. Thus, the controller may produce graphs which clearly show the progression of a fault.

The recommendation may be output to display 105, for an operator to view, along with any graphs or additional information that may be useful to the operator in addressing the fault.

Thus, a method of identifying a fault in a system of gears in a wind turbine is provided that can accurately identify faults and track their progression.

Variations of features of the embodiment are possible. For example, the value indicative of damage incurred by the system of gears does not have to be the CSER. The value may be equal to the inverse of the CSER. Alternatively, the value may not be a ratio, it may be a difference between the quantities, or any other mathematical operation that is suitable as a value indicative of damage incurred by the system of gears.

Further, it is not necessary for the controller to compare the calculated values to a threshold or issue a recommendation. For example, the CSER values calculated by the controller may simply be outputted to a display as they are calculated. The operator may then analyse the values and determine is any action is needed in relation to a fault. Alternatively, or in addition, the controller may compare CSER values and track the change in the CSER values over time. These changes may then be output to a display. Alternatively, or in addition, these changes may be compared to a threshold value and when the threshold is exceeded (i.e. indicating that a fault has progressed to a point where action is required) a recommendation is output. The value indicative of damage incurred by the system of gears may be used by the controller in any other appropriate way to identify a fault in a system of gears in a wind turbine.

In addition to the above description of the present invention, two specific examples of how the invention may be implemented will now be provided.

The combined sideband energy ratio for gear health condition assessment is a condition monitoring technique, which can be implemented by running a Matlab™ script for signal processing the received *.UFF data (i.e. the CMS data). The calculations of the CSER and the results will provide a guide to gear condition assessment. The calculations and the results may be automatically written in an output spread sheet for example. The results can be trended for evaluating the condition of the gears.

Specific Example 1: Broken High Speed (HS) Pinion Tooth in a 3 MW Gearbox

An example of the invention will now be described in relation to tests performed with a 3 MW three-stage gearbox, having two planetary and one parallel stage with ratio 1:112.63 (Step-up). The nominal high speed stage (HSS) speed is 1450 RPM and nominal torque at HSS is 34 kNm. High speed pinion tooth flank failure occurred during the test.

TABLE 1

Summary of the Gearbox shaft speeds and TMF of 3 MW gearbox

| Description | No of Teeth | RPM | RPS (Hz) | Stage |
|---|---|---|---|---|
| Carrier (Input) | — | 13.24 | 0.22 | Low Speed |
| Ring Gear (Stationary) | 93 | 0.00 | 0.00 | Planetary stage (LSP) |
| Planet | 35 | −35.17 | −0.59 (opposite direction) | |
| Sun Pinion (Output) | 23 | 66.76 | 1.11 | |
| Ring Gear (Stationary) | 118 | 0.00 | 0.00 | Intermediate Speed |
| Planet | 47 | −167.62 | −2.79 | Planetary |
| Sun Pinion (Output) | 23 | 409.30 | 6.82 | stage (ISP) |
| Gear Wheel | 102 | 409.30 | 6.82 | High Speed |
| Output Pinion | 28 | 1491.01 | 24.85 | stage (HS) |
| Gear Ratio of LSP | — | 5.0435 | | |
| Gear Ratio of ISP | — | 6.1304 | | |
| Gear Ratio of HS | — | 3.6428 | | |
| TMF and its harmonics | LSP in Hz | ISP in Hz | HS in Hz | |
| 1XTMF | 20.5186 | 131.3036 | 695.8028 | |
| 2XTMF | 41.0372 | 262.6073 | 1391.6057 | |
| 3XTMF | 61.5558 | 393.9109 | 2087.4085 | |

Tooth mesh frequency (TMF) and shaft speeds of all the three stages are presented in Table 1 and are referred to in this section. The significance of CSER of a healthy and faulty gear mesh due to a broken gear tooth is explained quantitatively using relevant trend plots in this section.

Figure 3:
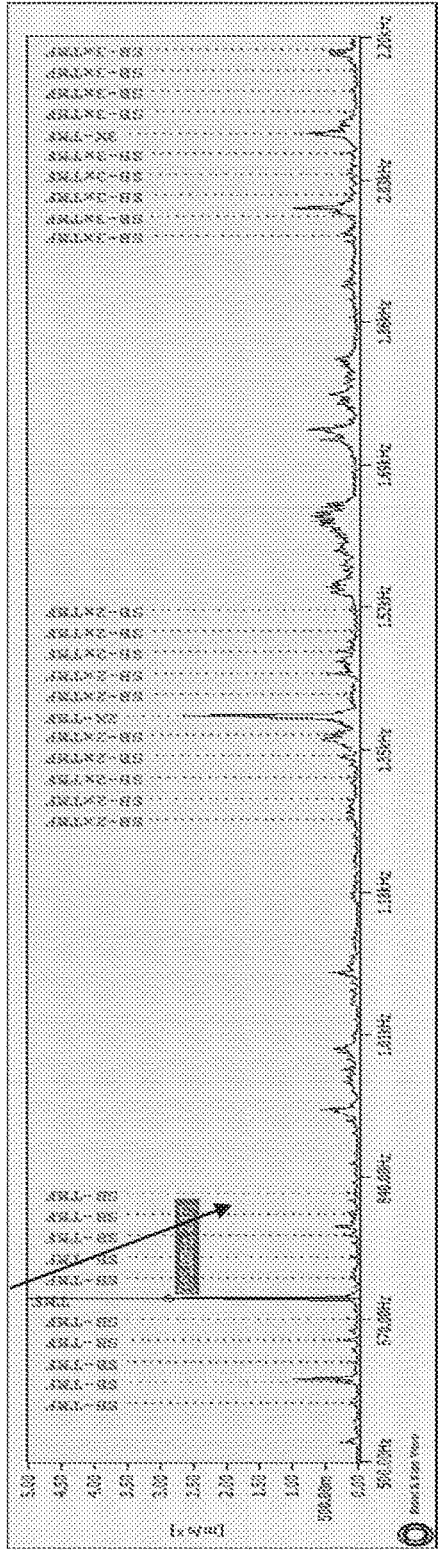
FIG. 3 shows a fast Fourier transform spectrum of a healthy system of gears according to a first specific implementation of the invention.

FIG. 3 shows a FFT spectrum 301 with a frequency range of 500 to 2200 Hz and resolution of 0.5 Hz, for a healthy gear. Sideband energy levels are present around each of the 1×, 2× & 3×TMF amplitudes (i.e. the TMF1, TMF2 and TMF3 frequencies). However, as this is the spectrum for a healthy gear, these sidebands are small. The CSER for the healthy gear mesh is 0.718.

A time waveform of a healthy gear would have no periodic impact spikes. A Crest Factor (CF) value, which is the ratio of peak acceleration over RMS acceleration, was also calculated during testing to provide an indication of a healthy gear box, as a way of tracking damage and confirming that damage incurred by the system of gears can indeed be determined based upon the first centre harmonic frequency amplitude and the average sideband amplitude. For example, the Crest Factor for a healthy gear mesh during testing in this example was 4.31.

Figure 4:
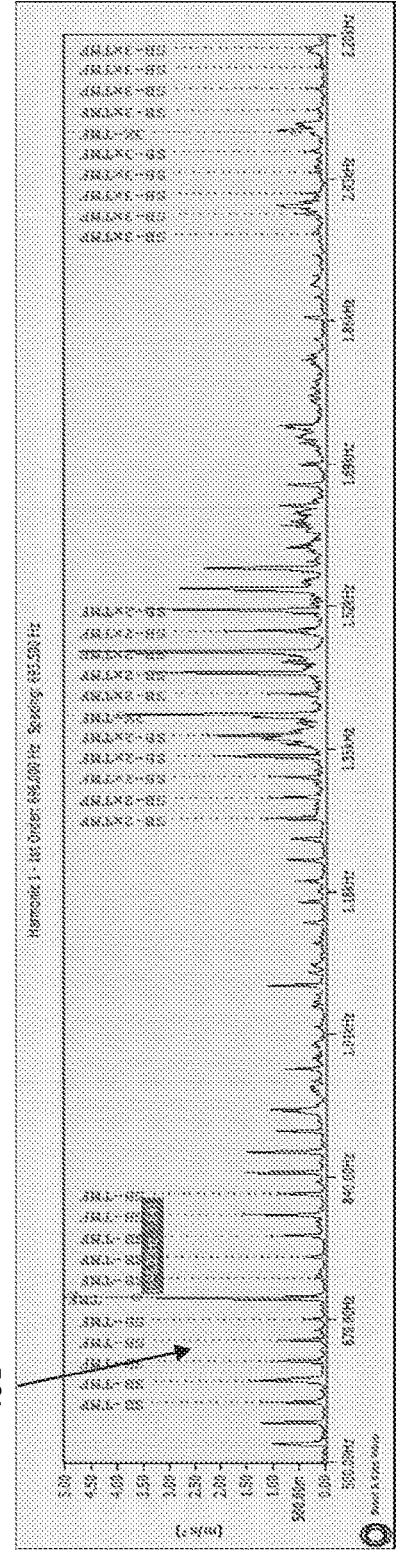
FIG. 4 shows a fast Fourier transform spectrum of a faulty system of gears according to a first specific implementation of the invention.

FIG. 4 shows a FFT spectrum 401 of a faulty gear mesh. The FFT spectrum 401 has sideband energy levels around 1× & 2×TMF of the HS stage that are significantly higher than those shown for FIG. 3.

The CSER for the faulty gear mesh is 4.59, which is a significant increase compared with a healthy gear mesh CSER. The presence and spacing of the sidebands around 1× and 2×TMF in the spectra indicate that the sideband modulation is occurring once per turn of the high speed shaft. Also, the fact that the 1× and 2× centre mesh frequencies belong to the HS gear mesh indicates that the damage causing the modulation passes through that mesh. From this information it can be diagnosed that there is damage to the HS pinion in this gearbox.

A time waveform of a faulty gear mesh may have a CF value which indicates that a fault is present in the system of gears. For example, during testing in this example, the CF value for a faulty gear mesh was 5.933. This is a significant increase in CF compared with healthy gear mesh CF. There is also an increase in CSER, which is evidence of the impact spikes present in the time waveform. The time wave form for a faulty gear mesh may also show impact spikes once per revolution of the high speed shaft at, in this example, 24.83 Hz. The periodic impacts may be clearly visible throughout the time waveform window.

A trend plot, such as a plot of frequency (Hz) and vibration acceleration amplitude (m/s$^2$) updated over time, can clearly reveal the growth of number of sidebands around 1× and 2×TMF over a period of time from a healthy to a faulty gear mesh. The amplitude of the sidebands and their harmonics on such a plot are also observed to be increased for damaged gears. Such plots can quantitatively indicate the increase in CSER proportionate to gear fault progression (from gear defect initiation to failure).

Figure 5:
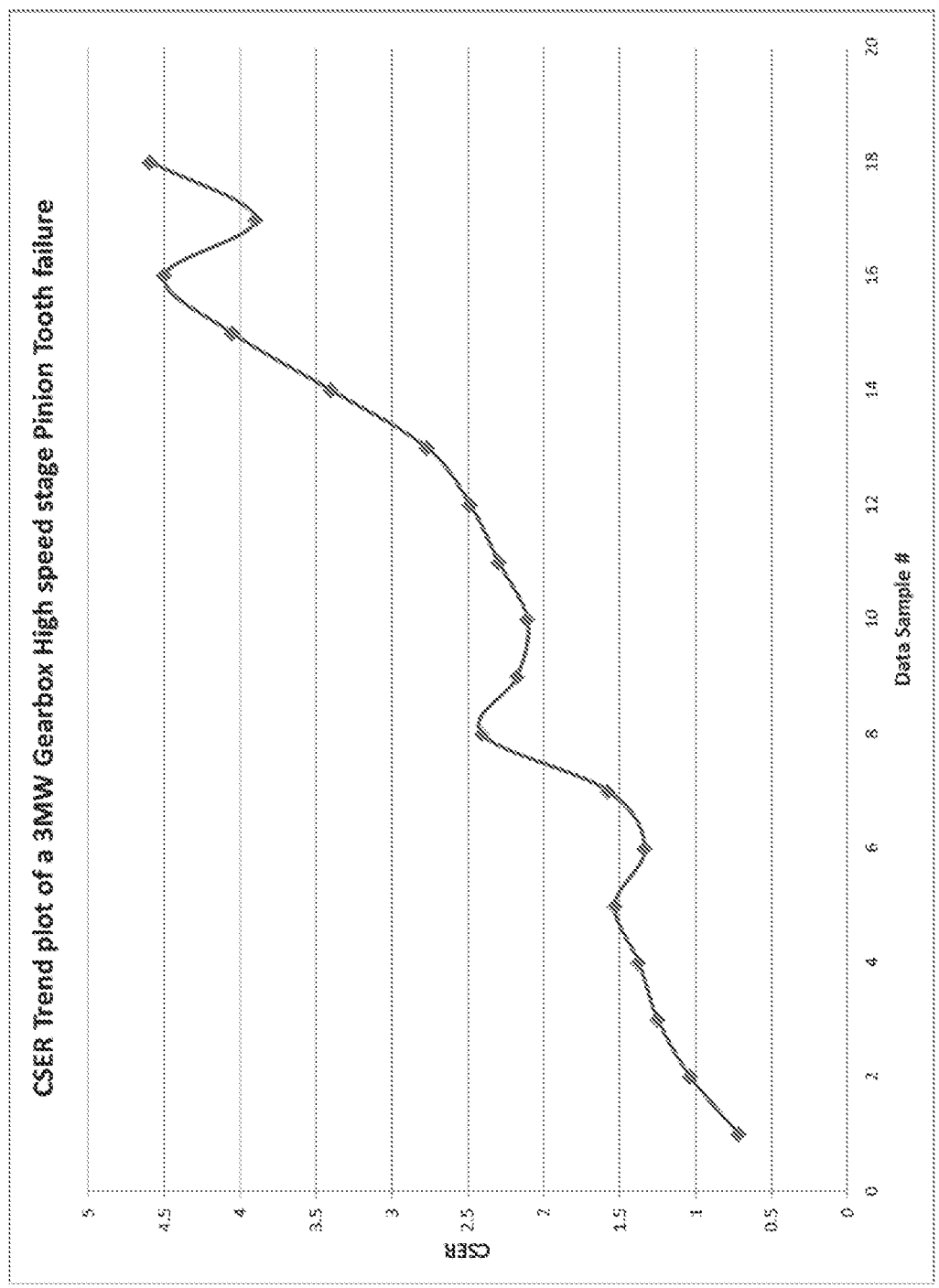
FIG. 5 shows a CSER trend plot for a number of centre harmonic frequency amplitudes of a system of gears according to a first specific implementation of the invention.

FIG. 5 shows a CSER trend plot. The X-axis and Y-axis represents sample number and CSER values respectively.

With reference to FIG. 5, each sample number represents an iteration in the method embodying the present invention described above. Controller 104 obtains a fundamental tooth mesh frequency (TMF1) amplitude and an amplitude at a harmonic of the fundamental frequency (TMF2) at step 204 for the first time (i.e. the first iteration). The controller 104 then obtains six sideband amplitudes on either side of centre amplitudes, calculates the sum of all the sideband amplitudes and a sum of the centre amplitudes at steps 205, 206 and 207. The controller 104 then calculates the CSER value for the system of gears at this point in time at step 208. This is represented in the figure as the data point on the far left.

At this point in time, there is no fault in the system of gears. As a result, the modulation of the centre amplitudes is small. Thus, the total centre amplitude is large relative to the total sideband amplitude and the CSER value is relatively small. This value is below the threshold, and as such the controller repeats the process.

As can be seen from FIG. 5, the controller 104 repeats the process 18 times, calculating 18 values of the total centre frequency amplitude, the total sideband amplitudes, and the CSER values over time. As can be seen, over the period the method is run, a fault develops in the system of gears. There is a marked rise in the value of the CSER.

This information may be output to the display 105, along with any recommendations for an operator to view.

Specific Example 2: Pinion Tooth Crack in a 2 MW Gearbox

The gearbox in this example case study is a three-stage, one planetary and two parallel stage, helical unit configuration with gear ratio 1:112.24 (Step-up). The nominal HSS speed is 1553 RPM and the nominal torque at HSS is 21 kNm. An intermediate pinion tooth crack occurred at the end of the test due to fatigue failure.

TABLE 2

Summary of the Gearbox shaft speeds and TMF of 1.8 MW gearbox

| Description | No of Teeth | RPM | Hz | Stage |
|---|---|---|---|---|
| Carrier (Input) | | 14.94 | 0.25 | P |
| Ring Gear (stationary) | 95 | 0.00 | 0.00 | |
| Planet | 37 | 38.34 | 0.64 | |
| Sun Pinion (Output) | 19 | 89.58 | 1.493 | |
| Gear wheel | 84 | 89.58 | 1.493 | IS |
| Output Pinion | 22 | 342.06 | 5.70 | |
| Gear Wheel | 109 | 342.06 | 5.70 | HS |
| Pinion (Output) | 24 | 1553.40 | 25.89 | |

TABLE 2-continued

Summary of the Gearbox shaft speeds and TMF of 1.8 MW gearbox

| Description | No of Teeth | RPM | Hz | Stage |
|---|---|---|---|---|
| Gear Ratio of P | | 6.00 | | |
| Gear Ratio of IS | | 3.8100 | | |
| Gear Ratio of HS | | 4.5400 | | |
| TMF and its harmonics | P in Hz | IS in Hz | HS in Hz | |
| 1XTMF | 23.65 | 125.4121 | 621.3600 | |
| 2XTMF | 47.30 | 250.82 | 1242.72 | |
| 3XTMF | 70.95 | 376.24 | 1864.08 | |

The summary of gearbox shaft speeds and TMF of a 2 MW gearbox are tabulated in Table 2. Further, TMF and its harmonics of the planetary, intermediate and high speed stage and their corresponding shaft speeds are presented in Table 2 and are referred to in this section.

Figure 6:
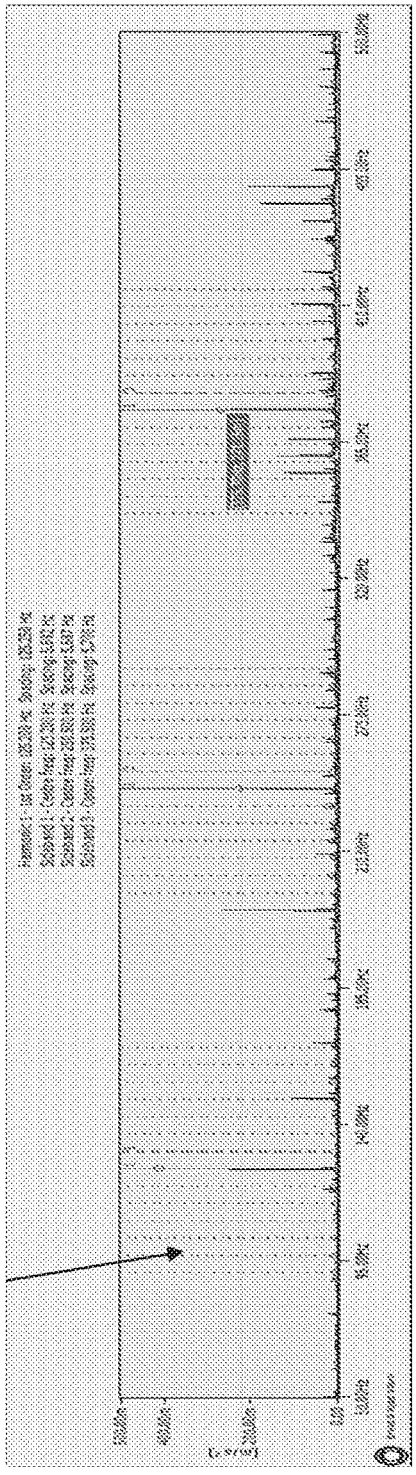
FIG. 6 shows a fast Fourier transform spectrum of a healthy system of gears according to a second specific implementation of the invention.

FIG. 6 shows that a FFT spectrum 601 of a healthy gear mesh has 1× and 2×TMF and its harmonics along with sidebands spaced at IMS revolution. As the FFT spectrum 601 is of a healthy gear mesh the sideband energy levels around 1× and 2×TMF are observed to be small. CSER is 1.4 for a healthy gear component.

As described above, a time waveform of a healthy gear may have no periodic impact spikes for intermediate speed (IMS) shaft revolutions. The CF value for the healthy gear in this example was 4.38.

Figure 7:
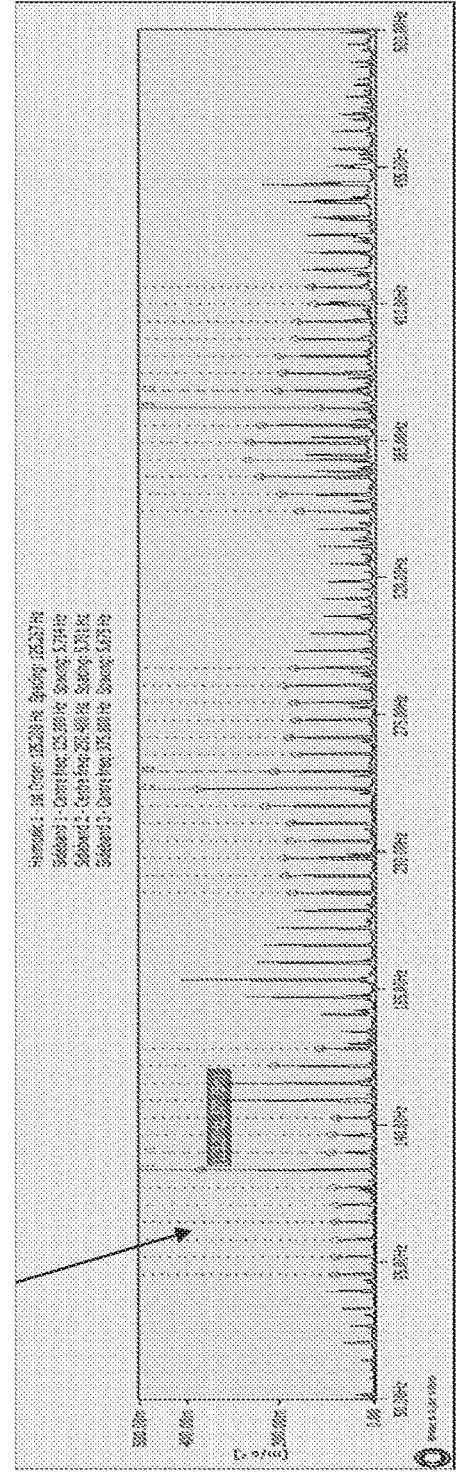
FIG. 7 shows a fast Fourier transform spectrum of a faulty system of gears according to a second specific implementation of the invention.

FIG. 7 shows a FFT spectrum 701 for a faulty gear mesh. The FFT spectrum 701 has a 1×TMF of IMS and harmonics, with sidebands spaced at IMS running speed that indicate IMS pinion damage.

CSER for the faulty gear mesh is 7.34, which is a significant increase compared with the healthy gear mesh CSER. The presence and spacing of the sidebands around 1×, 2× and 3×TMF in the spectra indicate that sideband modulation is occurring once per turn of the IMS. Also, the fact that the 1×, 2× centre mesh frequencies belong to the IS gear mesh indicates that the damage causing the modulation passes through that mesh. From this information we can diagnose that there is damage to the intermediate pinion in this gearbox.

A time waveform of the faulty gear in this example had a CF value of 7.22. Further the time waveform had periodic impact spikes that were clearly visible throughout the time waveform window. There may be a significant difference between a healthy gear mesh and faulty gear mesh time waveform as amplitude modulations are evident. This is a confirmation of the gear defect along with FFT spectra.

Figure 8:
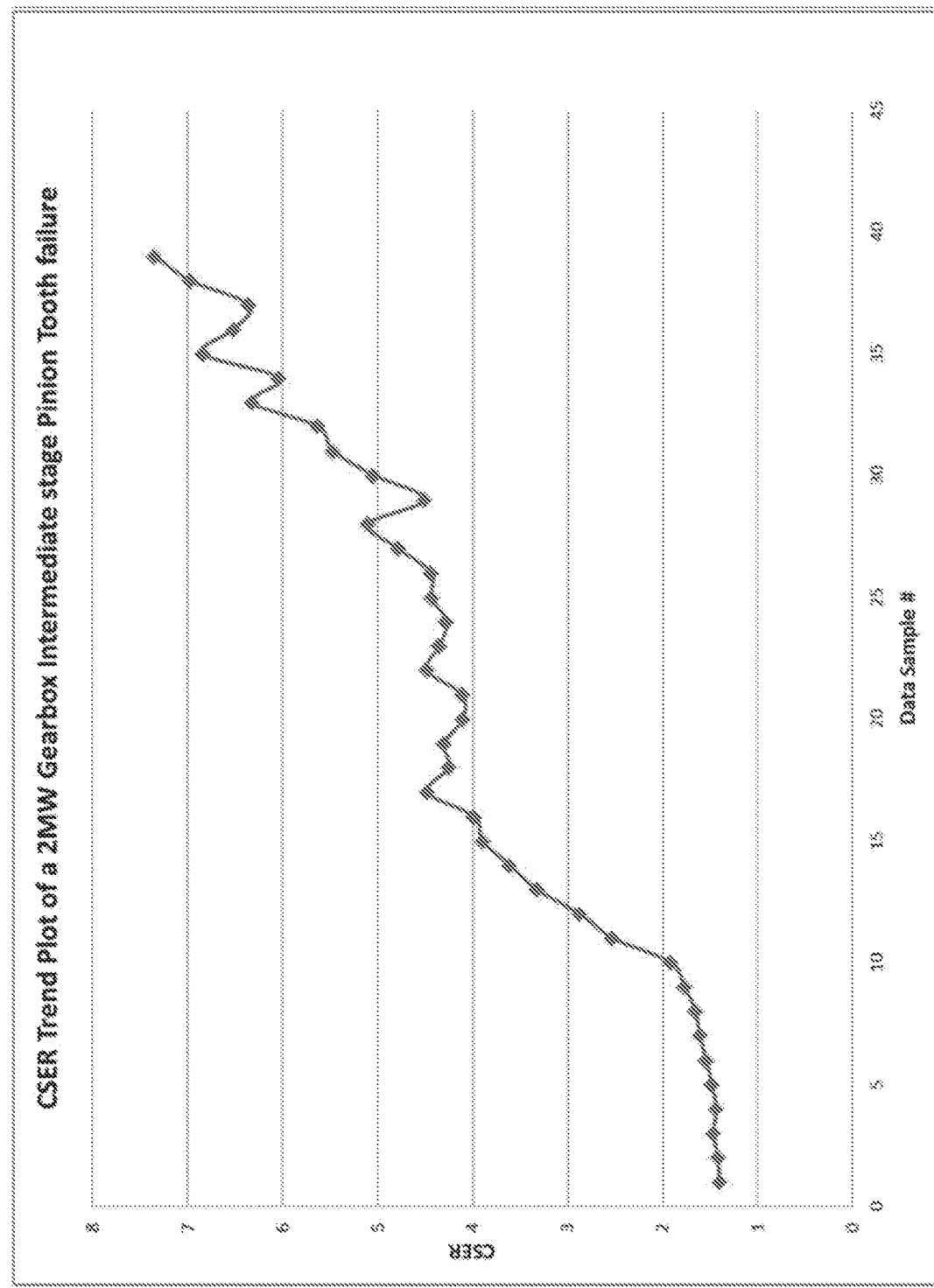
FIG. 8 shows a CSER trend plot for a number of centre harmonic frequency amplitudes of a system of gears according to a second specific implementation of the invention.

FIG. 8 shows a CSER trend plot. The X-axis and Y-axis represents sample number and CSER values respectively. The data for this plot is collected in the same manner as described with respect to FIG. 5. For this second specific example, it can be seen that the controller 104 repeats the process 40 times, calculating 40 values of the total centre frequency amplitude, the total sideband amplitudes, and the CSER values over time. As can be seen, over the period the method is run, a fault develops in the system of gears. There is a marked rise in the value of the CSER.

Whilst the invention has been described primarily in relation to a wind turbine controller, embodiments can be implemented on any appropriate computing device or platform.

Embodiments of the invention may include a wind turbine, or wind park, controller configured to adjust one or more operating parameters of a wind turbine based upon the output of any of the methods described herein. In particular, the controller may shut down, or reduce power generated by, a wind turbine when the method output indicates damage has occurred. This may be implemented using one or more thresholds applied to one or more of the MI ratios for respective harmonics, for example, whereby when the threshold is passed or exceeded by a particular MI ratio, action is taken by the controller to limit or prevent further damage to the gear components.

The invention claimed is:

1. A method of identifying a fault in a system of gears in a wind turbine, the method comprising:
   determining two or more centre harmonic frequency amplitudes according to vibrations of the system of gears;
   determining a plurality of sideband amplitudes of each of the centre harmonic frequency amplitudes;
   summing the two or more centre harmonic frequency amplitudes to calculate a total centre harmonic frequency amplitude;
   summing each of the sideband amplitudes of the two or more centre harmonic frequency amplitudes to calculate a total sideband amplitude; and
   determining a value indicative of damage incurred by the system of gears based upon the total sideband amplitude and the total centre harmonic frequency amplitude.

2. The method according to claim 1 wherein the two or more centre harmonic frequency amplitudes are centre harmonic tooth mesh frequency amplitudes.

3. The method according to claim 2, wherein the system of gears is a multi stage system of gears and wherein each centre harmonic frequency amplitude is correlated to a mesh between gears, the method further comprising[[ ]] determining a fault within a particular mesh of gears within the system of gears based upon the value indicative of damage for the two or more centre harmonic frequency amplitudes.

4. The method according to claim 1 wherein a first centre harmonic frequency amplitude of the two or more centre harmonic frequency amplitudes is at a fundamental harmonic frequency for the system of gears.

5. The method according to claim 1 wherein one or more of the two or more centre harmonic frequency amplitudes are at a harmonic of a fundamental harmonic frequency amplitude.

6. The method according to claim 4, wherein a second centre harmonic frequency amplitude is at a second harmonic of the first centre harmonic frequency amplitude, and a third centre harmonic frequency amplitude is at a first harmonic of the first centre harmonic frequency amplitude different to the second centre harmonic frequency amplitude.

7. The method according to claim 1 wherein determining the value comprises calculating a ratio of the total centre harmonic frequency amplitude and the total sideband amplitude or vice versa.

8. The method according to claim 7 wherein the ratio is compared to a threshold to identify whether a fault is present in the system of gears.

9. The method according to claim 8 wherein the method further comprises repeatedly calculating the ratio while the ratio is within the threshold to obtain a plurality of ratio values.

10. The method according to claim 8 wherein, if a ratio value is calculated that is outside the threshold, outputting data indicating that a fault has been identified in the system of gears.

11. The method according to claim 7 wherein the method further comprises repeatedly calculating the ratio for a predetermined period of time to obtain a plurality of ratio values.

12. The method according to claim 11 wherein the plurality of ratio values are used to track progression of a fault.

13. The method according to claim 12 wherein the fault is tracked by comparing each successively calculated ratio value with a threshold value.

14. The method according to claim 12 wherein the fault is tracked by comparing each ratio value of the plurality of ratio values with one or more other ratio values of the plurality of ratio values.

15. The method according to claim 1 wherein at least six sideband amplitudes on either side of each central harmonic frequency amplitudes are used to calculate average sideband amplitudes.

16. The method according to claim 1 further comprising controlling the wind turbine based on the value indicative of damage.

17. A controller configured to perform an operation of identifying a fault in a system of gears in a wind turbine, the operation comprising:
  determining two or more centre harmonic frequency amplitudes according to vibrations of the system of gears;
  determining a plurality of sideband amplitudes of each of the centre harmonic frequency amplitudes;
  summing the two or more centre harmonic frequency amplitudes to calculate a total centre harmonic frequency amplitude;
  summing each of the sideband amplitudes of the two or more centre harmonic frequency amplitudes to calculate a total sideband amplitude; and
  determining a value indicative of damage incurred by the system of gears based upon the total sideband amplitude and the total centre harmonic frequency amplitude.

18. A wind turbine, comprising:
  a tower;
  a nacelle disposed on the tower;
  a rotor extending from the nacelle;
  a plurality of blades coupled to one end of the rotor; and
  a controller configured to perform an operation of identifying a fault in a system of gears in a wind turbine, the operation comprising:
    determining two or more centre harmonic frequency amplitudes according to vibrations of the system of gears;
    determining a plurality of sideband amplitudes of each of the centre harmonic frequency amplitudes;
    summing the two or more centre harmonic frequency amplitudes to calculate a total centre harmonic frequency amplitude;
    summing each of the sideband amplitudes of the two or more centre harmonic frequency amplitudes to calculate a total sideband amplitude; and
    determining a value indicative of damage incurred by the system of gears based upon the total sideband amplitude and the total centre harmonic frequency amplitude.

19. A computer program which when executed on a controller causes the controller to perform an operation of identifying a fault in a system of gears in a wind turbine, the operation comprising:
  determining two or more centre harmonic frequency amplitudes according to vibrations of the system of gears;
  determining a plurality of sideband amplitudes of each of the centre harmonic frequency amplitudes;
  summing the two or more centre harmonic frequency amplitudes to calculate a total centre harmonic frequency amplitude;
  summing each of the sideband amplitudes of the two or more centre harmonic frequency amplitudes to calculate a total sideband amplitude; and
  determining a value indicative of damage incurred by the system of gears based upon the total sideband amplitude and the total centre harmonic frequency amplitude.

* * * * *